United States Patent [19]

Wellington et al.

[11] Patent Number: 4,502,538

[45] Date of Patent: Mar. 5, 1985

[54] POLYALKOXY SULFONATE, $CO_2$ AND BRINE DRIVE PROCESS FOR OIL RECOVERY

[75] Inventors: Scott L. Wellington; Joseph Reisberg; Eugene F. Lutz; David B. Bright, all of Houston, Tex.

[73] Assignee: Shell Oil Company, Houston, Tex.

[21] Appl. No.: 569,423

[22] Filed: Jan. 9, 1984

[51] Int. Cl.³ .................... E21B 43/22; E21B 47/06
[52] U.S. Cl. .................... 166/252; 166/273; 166/274
[58] Field of Search ............ 166/250, 252, 273, 274, 166/275, 305 R; 252/8.55 D

[56] References Cited

U.S. PATENT DOCUMENTS

| | | | |
|---|---|---|---|
| 3,342,256 | 9/1967 | Bernard et al. | 166/273 |
| 3,529,668 | 9/1970 | Bernard | 166/275 X |
| 3,583,483 | 6/1971 | Foote | 166/250 |
| 4,088,190 | 5/1978 | Fischer et al. | 166/305 R X |
| 4,113,011 | 9/1978 | Bernard et al. | 166/274 X |
| 4,161,217 | 7/1979 | Dilgren et al. | 166/252 |
| 4,380,266 | 4/1983 | Wellington | 166/252 |
| 4,445,573 | 5/1984 | McCaleb | 166/250 |

FOREIGN PATENT DOCUMENTS 823466 9/1969 Canada .................. 166/274

Primary Examiner—George A. Suchfield

[57] ABSTRACT

Oil is displaced within a subterranean reservoir by injecting a combination of substantially liquefied $CO_2$, brine and surfactant material into the reservoir, with the surfactant material being a polyalkoxy aliphatic sulfonate surfactant material which has specified dispersing and partitioning properties in contact with the brine and the fluids in the reservoir at the reservoir temperature and a pressure sufficient to substantially liquefy the $CO_2$ within the reservoir.

21 Claims, 4 Drawing Figures

CO2 AND AQUEOUS
SURFACTANT SOLUTION
DISPERSED WITHIN
OIL

CO2 AND OIL
DISPERSED WITHIN
AQUEOUS SURFACTANT
SOLUTION

CO2 DISPERSED
WITHIN AQUEOUS
SURFACTANT
SOLUTION

POLYALKOXY SULFONATE, CO2 AND BRINE DRIVE PROCESS FOR OIL RECOVERY

CROSS REFERENCE TO RELATED APPLICATION

The present invention is related to the invention described in U.S. Pat. No. 4,380,266, issued Apr. 19, 1983, to Scott L. Wellington. That patent describes a process for displacing oil within a subterranean reservoir by injecting fluid containing substantially liquefied $CO_2$, saline water and surfactant. The injected surfactant is a reservoir-tailored polyalkoxyalcohol or phenol surfactant. It is also a surfactant of that chemical class which is capable of forming relatively homogeneous stable dispersions of: (a) $CO_2$ in aqueous surfactant solution, (b) $CO_2$ and oil in aqueous surfactant solution and (c) $CO_2$ and aqueous surfactant in oil; where the dispersions are formed at reservoir temperature and a $CO_2$-liquefying pressure, and contain an oil and an aqueous liquid which are the same as, or substantially equivalent to, those in the reservoir. The disclosures of that patent (hereinafter referred to as the '266 patent), are included herein by reference.

BACKGROUND OF THE INVENTION

The present invention relates to a fluid drive oil recovery process which utilizes an injection of substantially liquid $CO_2$, surfactant and water into a subterranean oil reservoir. More particularly, the invention relates to such a process in which the surfactant selected for use is particularly insensitive to high temperature and high salinity and is tailored to suit the chemical properties of the oil and water in the reservoir to be treated.

Numerous patents describe materials and techniques pertinent to an oil recovery process involving an injection of $CO_2$, surfactant and water. The U.S. Pat. Nos. 2,226,119; 2,233,381 and 2,233,382 describe polyalkoxylated alcoholic or phenolic surfactants which are generally useful in many aqueous liquid fluid drive oil recovery processes. Patent 2,623,596 indicates that an increased oil recovery may be obtained by a fluid drive process which injects highly pressurized $CO_2$. U.S. Pat. No. 3,065,790 indicates that, in a fluid drive process, the cost effectiveness of highly pressurized $CO_2$ may be increased by injecting a slug of the $CO_2$ ahead of a cheaper drive fluid. U.S. Pat. No. 3,330,346 indicates that almost any process for forming foam within a reservoir may be improved by using as the surfactant "OK Liquid", a polyalkoxylated alcohol sulfate of a mixture of alcohols plus a fatty acid amide builder. U.S. Pat. No. 3,342,256 indicates that, in a fluid drive process, the oil-displacing efficiency of a $CO_2$ slug may be increased by including water and a foaming surfactant within that slug. U.S. Pat. No. 3,529,668 indicates that, in a fluid drive process, the efficiency of a slug of foamed $CO_2$ may be increased by displacing it with specifically proportioned alternating slugs of gas and liquid. U.S. Pat. No. 4,088,190 indicates that, in a fluid drive process, the heat stability and durability of a $CO_2$ foam may be increased by using an alkyl sulfoacetate surfactant. U.S. Pat. No. 4,113,011 indicates that in a $CO_2$ foam drive, the problems of low salt tolerance which are typical of both the surface-active sulfates of polyalkoxylated alcohols containing 10 to 16 carbon atoms recommended by U.S. Pat. No. 3,330,346 and the alkyl sulfoacetate surfactants recommended by U.S. Pat. No. 4,088,190 may be avoided by using a surfactant sulfate of a polyalkoxy alcohol containing only 8 or 9 carbon atoms and injecting that surfactant ahead of the $CO_2$.

An article by T. M. Doscher and M. L. El Arabi (Oil and Gas Journal, Apr. 12, 1982, pages 144-151) "Scale Model Experiments Show How $CO_2$ Might Economically Recover Residual Oil" describes how field tests have shown that $CO_2$ can mobilize and displace oil but so far the results "provide little support for the conclusion that carbon dioxide can economically recover residual oil". The authors state that "the efficiency of the process appears to depend primarily on the displacement of mobile water to expose the occluded oil to the carbon dioxide". They also mention how the problems due to gravity layover and reservoir heterogeneity are magnified by the high mobility of $CO_2$ and state that "practical methods for decreasing the mobility of carbon dioxide have not yet been developed" (page 150, last paragraph).

Thus, it is known to inject substantially liquefied $CO_2$, surfactant and aqueous liquid into a subterranean reservoir to displace oil within the reservoir. It is known that where the salinity of the water available for use in such an injection and the temperature of the reservoir are suitably low, a selection can be made of a polyalkoxy alcohol nonionic surfactant which is particularly effective for decreasing the mobility of the $CO_2$ in the reservoir. The '266 patent discloses that such a nonionic surfactant is one which is capable of forming each of three specified types of dispersions in contact with the reservoir oil and the water to be injected, at the reservoir temperature and a $CO_2$-liquefying pressure. It is further known that, in general, water-soluble polyalkoxy sulfonate surfactants have good chemical stability and good emulsifying capabilities, even at relatively high temperatures and high water salinities.

However, particularly with respect to oil reservoirs which are relatively hot and/or the water available for injecting is highly saline, it was not previously known that the above criteria or any criteria might identify a combination of water-soluble polyalkoxy sulfonate surfactant and aqueous liquid which, when injected along with substantially liquefied-$CO_2$, would significantly reduce the mobility of the $CO_2$ in a manner capable of increasing the preferential displacement of water in the reservoir and increasing the ratio of oil displaced-to-amount of $CO_2$ injected.

SUMMARY OF THE INVENTION

The prevent invention relates to an improved process for injecting substantially liquefied $CO_2$, surfactant and aqueous liquid into a subterranean oil reservoir to displace oil within the reservoir. The improvement is provided by using a combination of surfactant and aqueous liquid having particular characteristics relative to the physical and chemical properties of the fluids and minerals in the reservoir to be treated. A surfactant is selected which (a) consists essentially of at last one water-soluble polyalkoxy sulfonate surfactant and (b) dissolves in the aqueous liquid to be injected to form a surfactant solution which is capable of forming three types of dispersions that are significantly stable at the reservoir temperature and a pressure which substantially liquefies $CO_2$ within the reservoir. Those dispersions are: $CO_2$ dispersed in the surfactant solution, $CO_2$ and the reservoir oil (or an equivalent oil) dispersed in the surfactant solution, and $CO_2$ and the surfactant solution dispersed in the reservoir oil. The composition of the selected surfactant and/or the aqueous liquid to be injected is adjusted, to the extent required, so that (a) at the reservoir temperature, a mixture of substantially liquefied $CO_2$ and the solution of the surfactant in the aqueous liquid is significantly less mobile than the $CO_2$ alone and (b) the amount of surfactant needed for maintaining a significantly low mobility remains dissolved in the aqueous liquid when that solution and substantially liquefied $CO_2$ are equilibrated with the reservoir oil. Substantially liquefied $CO_2$ and the so-selected and so-adjusted surfactant and aqueous liquid are injected into the reservoir in a sequence causing the $CO_2$ to become dispersed in a solution of the surfactant in the aqueous liquid before or soon after those materials enter the reservoir. As a result, the so-formed dispersion is capable of displacing water within the reservoir while flowing around oil droplets, dispersing at least some oil along with the $CO_2$ in the surfactant solution, and subsequently, dispersing at least some $CO_2$ and surfactant solution in the oil, in a manner causing the oil to become swollen by the $CO_2$ and more mobile as well as being displaced through the pores of the reservoir.

It is known that various reservoirs are susceptible to reactions such as ion-exchange, clay-swelling or the like which may damage the reservoir or may significantly alter the solubility of a surfactant in an injected water. Such a solubility-alteration is particularly responsive to a change in the ratio of monovalent cations to polyvalent cations within the injected water. In a particularly suitable embodiment of the present invention, the aqueous liquid which is injected is the reservoir water, or is water which was injected into the reservoir and thus was equilibrated with the reservoir rock. It is sometimes advantageous to inject an aqueous liquid which is less saline than the reservoir water or a water equilibriated with the reservoir rocks. In the latter situation it is preferable that the more dilute liquid contain the same or a substantially equivalent ratio of concentration of monovalent cations to the square root of the concentration of multivalent cations.

DESCRIPTION OF THE INVENTION

The present invention is, at least in part, premised on a discovery that not all water-soluble polyalkoxy sulfonates having the dispersion-forming properties described above comprise efficient surfactants for use with particular aqueous liquids and/or reservoirs. Particularly where the reservoir water and/or aqueous liquid to be used is relatively saline, an adjustment may be needed regarding the composition of the surfactant and/or the aqueous liquid in order to provide a combination which will remain effective for reducing the mobility of $CO_2$ within the reservoir. The capability of the specified sulfonate surfactants to remain effective within the reservoir tends to decrease with increases in the salinity of the aqueous liquid in which they are dissolved and/or increases in the concentration of incompletely reacted materials and/or sulfonation reaction byproduct materials remaining in the surfactants. In general, it can be readily determined whether a particular one or mixture of such water-soluble polyalkoxy sulfonates which might be suitable for use in a given reservoir are capable of (a) forming the specified three types of dispersions, (b) whether and to what extent the selected surfactant should be purified by removing incompletely reacted materials and/or reaction byproduct materials, and/or (c) whether the composition of the aqueous liquid to be injected should be modified by dilution in order to provide an aqueous liquid solution capable of containing an effective amount of surfactant which will not be extensively partitioned into the oil-phase when the solution becomes equilibrated with the reservoir oil and liquefied $CO_2$ at the reservoir temperature.

Applicants have discovered that with respect to water-soluble polyalkoxy sulfonate surfactants which are to be flowed through an oil and water-containing reservoir, the reservoir temperature and the composition of the oil and minerals in the portions of the reservoir which will be contacted by the injected fluid, are all factors which may affect the suitability of a given surfactant for use in a given reservoir. They also discovered that a determination can be made as to the potential suitability of a given sulfonate surfactant for use in a given reservoir by determining whether that surfactant is capable of forming dispersions of the types described in the '266 patent in contact with the reservoir oil and aqueous liquid to be injected at the reservoir temperature and a $CO_2$-liquefying pressure.

Figure 3:
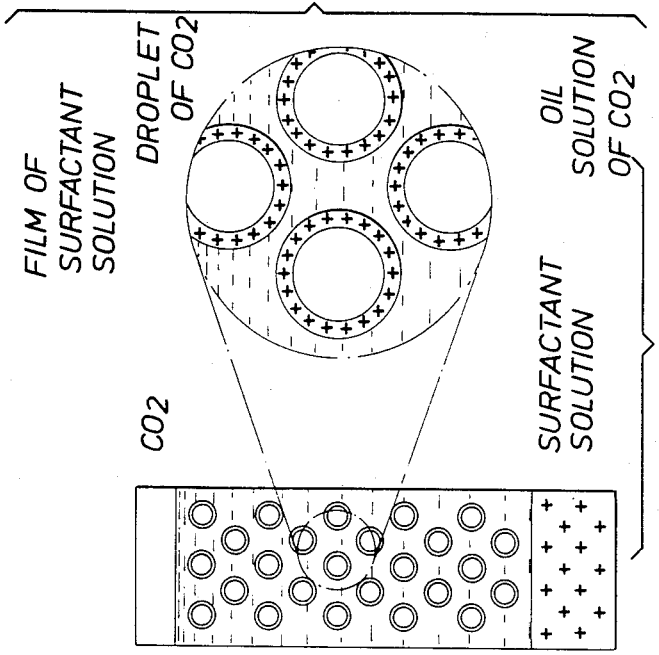
FIGS. 1, 2 and 3 are schematic illustrations of various dispersions as they appear in the window of a high pressure sight cell.
Figure 2:
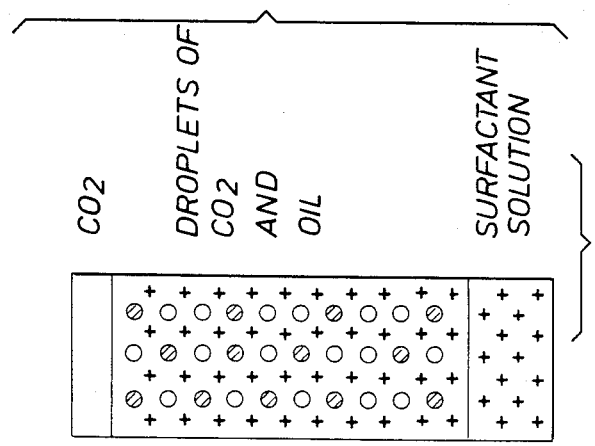
Figure 1:
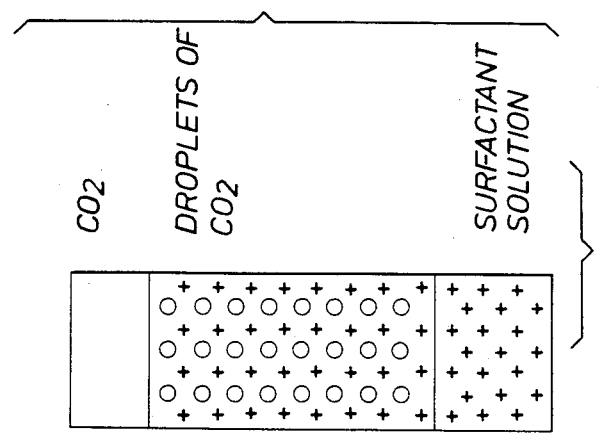

FIGS. 1 to 3 are schematic illustrations of the appearances of each of the three types of dispersions which should be capable of being formed with a surfactant which is suitable for use in the present process. The appearances of such dispersions are readily observable in high pressure sight glasses such as those of a Daniel High Pressure Gauge with see-through glass on both sides to permit the observation of interfaces between immiscible fluids.

Sight cell tests of the following type are particularly suitable for determining whether a particular surfactant is suitable for a particular reservoir. The sight cell and its contents are maintained at substantially the pressure and temperature to be employed within the reservoir. In forming each type of dispersion the aqueous liquid and $CO_2$ should be the same as or substantially equivalent to those to be injected into the reservoir and, in the dispersions in which oil is used, the oil should be the reservoir oil or a substantially equivalent oil. Such fluids can be introduced into the sight cell in substantially any order.

FIGS. 1–3 show how such dispersions are apt to look with respect to substantially any water-soluble polyalkoxy sulfonate surfactant and/or aqueous liquid or $CO_2$ which might be injected into the reservoir. The illustrated dispersions were each produced by pressurizing a sight cell containing the appropriate materials (using mercury pressurized with a hand operated pressure intensifier). Pressure measurements were made using a calibrated Heise Bourdon Tube Gauge. Coleman grade $CO_2$ was supplied to the cell from commercial cylinders. The brine used was a synthetic reservoir water and the oil used was a crude oil from that reservoir. Measured amounts of the brine and/or surfactant solution in brine were injected into the cell with a syringe. The cell was then pressurized with a selected amount of $CO_2$ and allowed to attain temperature equilibrium. After an equilibration period of about 30 minutes, the cell was rocked back and forth to mix its contents.

In a so-charged cell, the surfactant solution and $CO_2$ may appear transparent. When the $CO_2$ is contacted with crude oil its color changes from transparent to yellow to tan to brown to black (if the oil is black) as more and more heavy components of the oil dissolve in the $CO_2$. However, in the preferred surfactant-identifying test procedure, which involves only a single contact between the $CO_2$ and oil, the color of the $CO_2$ is seldom changed beyond very slightly yellow. Where the oil used is a refined oil, such as Soltrol, the $CO_2$ remains transparent.

FIG. 1 shows the appearance of a relatively stable and homogeneous dispersion of $CO_2$ in surfactant solution, in the absence of oil. In testing such dispersion the cell is preferably charged with substantially equal volumes of the $CO_2$ and surfactant solution. Numerous water-soluble polyalkoxy sulfonate surfactants may be capable of forming such dispersions in most brines likely to be used in the present process. But, it is important that such a dispersion be formed before or soon after the components enter the reservoir. Since there may be little or no oil in the near-well portion of the reservoir around an injection well (e.g., within about 10 feet from the well), it is desirable to be sure that the $CO_2$ to be used is capable of being dispersed in the surfactant solution to be used in a substantial absence of oil.

In the present type of sight cell tests, dispersions of the substantially liquefied $CO_2$ within a solution of surfactant in the brine have the appearance of a foam. This occurs in spite of the fact that, in many respects, the so-dispersed $CO_2$ is more like a dispersed liquid than a dispersed gas. In general, it is suitable to consider dispersions which break within less than about 30 minutes to be unstable and to select as suitable only those which last significantly longer. Of course, within the unobstructed internal volume of the sight cell, a small portion of fluids which are less dense or more dense than such a dispersion tend to be segregated above or below a layer of the dispersion. The brine is usually the most dense fluid, the $CO_2$ is usually the least dense and the oil usually has a density between those of the brine and the $CO_2$.

FIG. 2 shows the appearance of a suitably stable and homogeneous dispersion of $CO_2$ and oil within a solution of surfactant in brine. In this test, the cell is preferably charged with substantially equal parts by volume of the $CO_2$ and the surfactant solution in brine plus a significant but smaller proportion, such as from about 10 to 30 percent by volume of the oil relative to the total volume of $CO_2$ and surfactant solution. The oil tends to exert a significant debilitating effect on the stability of such dispersions. Water-soluble polyalkoxy sulfonate surfactants which form stable dispersions of the type shown in FIG. 1 may fail to form those of the type shown in FIG. 2—even when the proportion of oil is relatively small.

FIG. 3 shows the appearance of a suitably stable and homogeneous dispersion of both $CO_2$ and solution of surfactant in brine dispersed within oil. In this test, the sight cell is preferably charged with substantially equal volumes of $CO_2$ and surfactant solution plus a volume of oil exceeding the total volume of $CO_2$ and surfactant solution. This is a particularly stringent test involving the formation of a unique type of dispersion. The illustrated detail of the arrangement of films and droplets is, of course, speculative. However, the indicated arrangement appears to be consistent with the performance which has been exhibited in numerous laboratory tests of oil recovery processes. The forming of such a dispersion is consistent with the swelling and mobilizing of the oil so that it tends to become entrained in and displaced by the fluid being flowed through the pores of the reservoir.

One particularly unobvious and important feature of the present process is the fact that the relative mobilities (and effective viscosities) of the dispersions of the types shown in FIGS. 1, 2 and 3 tend to be substantially equal within permeable earth formations at the indicated conditions. Substantially no differences have been detectable in tests such as displacing such dispersions through cores of reservoir formations while monitoring the pressure required to maintain a given rate of flow or measuring falling times and/or falling rates of a ball within a sight cell containing such dispersions, etc.

Tests were made of the static adsorption of a polyalkoxy octylphenol sulfonate surfactant, available from Rohm and Hass Chemical Co. as Triton X-200, from synthetic "D" sand water (containing about 120,000 ppm TDS) onto crushed Berea sandstone at 75° F. and atmospheric pressure. The shape of the adsorption isotherm and extent of the adsorption (0.04 meq/100 g rock) were similar to those of petroleum sulfonates.

In a laboratory core flooding experiment, the differential pressure decreased from 7 to 3 psi as 1.2 PV of $CO_2$ alone was injected at 10 cc/hr into a Berea core containing 37 percent PV waterflood residual isooctane-diluted reservoir oil. While the brine was flowing in the core the apparent viscosity was 11 cp. After injecting 1.2 PV $CO_2$, the apparent viscosity decreased to 4 cp. The $CO_2$ recovered about one-half of the oil.

The core was cleaned and restored to waterflood residual oil saturation. Supercritical $CO_2$ and synthetic "D" sand water containing 0. 5 percent Triton X-200 were simultaneously injected in a ratio of 4:1, at a rate of 10 cc/hr combined fluid volume (corresponding to a reservoir flow rate of about 2 ft/day). The differential pressure increased from 12 to 20 psi (apparent viscosities increased from about 8 cp to about 13 cp) while 1.2 PV of the combined fluids were injected. Slightly more than one-half of the waterflood residual oil was recovered.

Reduction in $CO_2$ mobility control effectiveness when oil was added was expected in view of the high salinity synthetic reservoir "D" sand water. Such a brine is a poor solvent for the surfactant, especially in the presence of the amount of dissolved $CO_2$ at high pressure. It was found that as much as about 40 percent of the surfactant partitioned into the oil when 0.5 percent Triton X-200 in synthetic reservoir "D" sand water was contacted with the isooctane-diluted crude oil and supercritical $CO_2$ at 76° C. and 2500 psi. When $CO_2$ was not present, only 13 percent of the surfactant partitioned into the crude oil.

It is known that the presence of the oil can reduce the stability of a dispersion of $CO_2$ in an aqueous liquid by spreading at the interface and catastrophically destroying the disperions. However, high pressure sight cell shaking tests of Triton X-200 solutions, crude oil and supercritical $CO_2$ showed that the oil doesn't immediately collapse the dispersion of $CO_2$ in brine. Immediately after shaking, oil appeared as droplets or "islands" which were mobile. These "islands" drained through the thick plateau borders after shaking. The oil also "imbibed" into the plateau borders of the $CO_2$/aqueous dispersion after the larger "islands" drained and the plateau borders thinned. Again, this was not the classical, or expected, spreading phenomenon. If the oil had spread, the CO₂/ aqueous dispersion would have collapsed.

Figure 4:
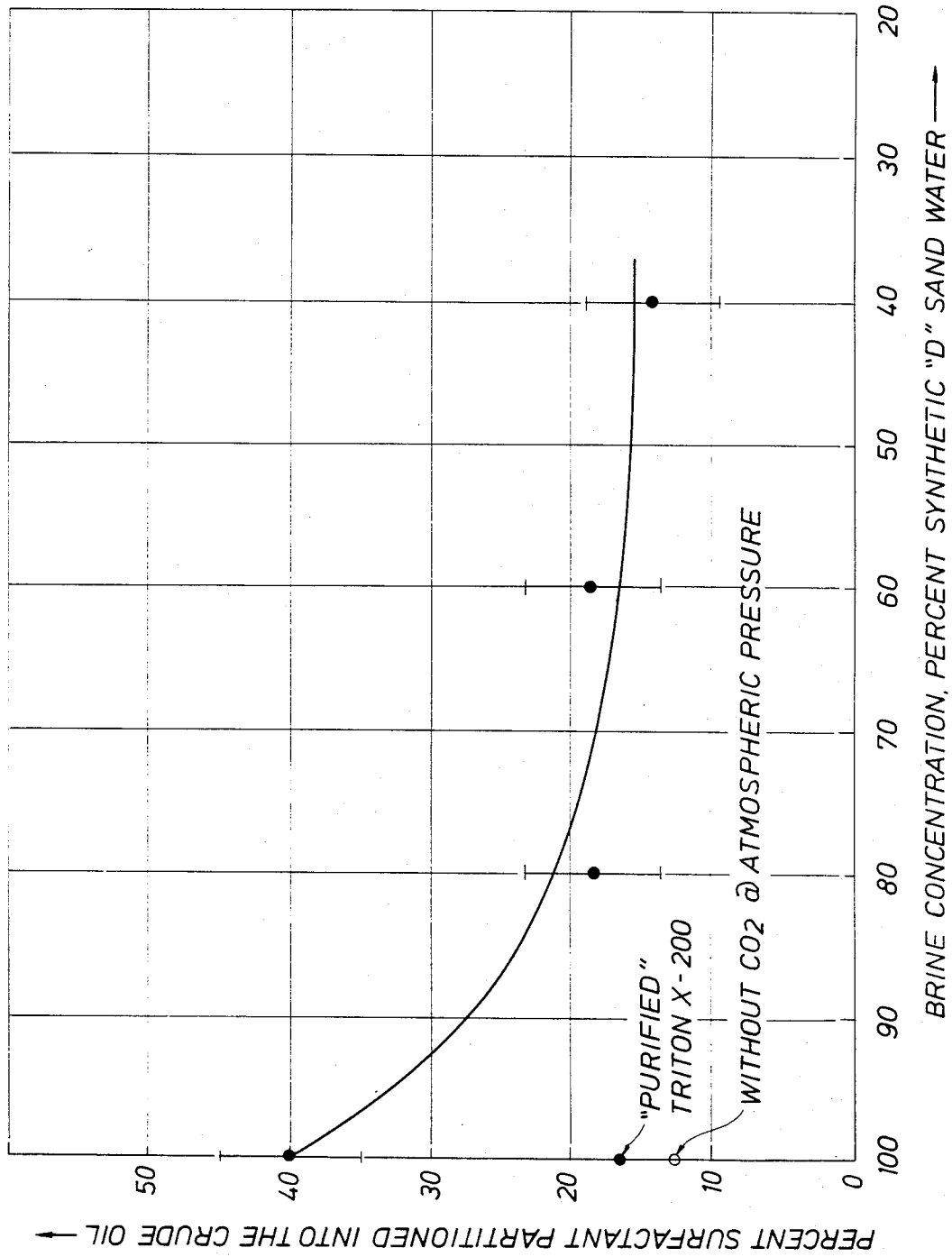
FIG. 4 shows a plot of changes in amount of surfactant partitioned into oil with changes in brine salinity.

FIG. 4 shows the variation in the amount of surfactant which is partitioned into crude oil with changes in brine concentration (in terms of percent synthetic "D" sand water mixed with distilled water). It was found that either refined or crude oil may significantly reduce the $CO_2$ mobility control-effectiveness of the Triton X-200 surfactant. In the 100% synthetic reservoir water (containing about 120,000 ppm/TDS) the reduction in effectiveness was very large.

For example, the apparent viscosity at steady state was about 300 cps when $CO_2$ and "D" sand water containing 0.5% Triton X-200 were simultaneously injected into a brine saturated Berea core (at a ratio of 4 parts by volume of the substantially liquefied $CO_2$ to 1 part brine) at a total flow rate of about 10 cc/hr (about 2 feet per day). The apparent viscosity dropped to about 10 centipoise in the presence of an isooctane diluted reservoir oil (a synthetic crude oil which is known to have solubility and mobility properties sybstantially similar to a typical reservoir crude oil).

The partitioning behavior of Triton X-200 surfactant material was determined by mixing and equilibrating equal volumes of surfactant solution and stock tank crude oil at 76° C. in a high pressure see-through cell at a $CO_2$-liquefying pressure. The equilibrated phases were forced through a back-pressure regulator, and the separated phases were collected as they outflowed from the back-pressure regulator. The surfactant concentration remaining in the aqueous phase before and after separation was determined (by a known Hyamine titration procedure).

When equal volumes of oil and synthetic "D" sand water containing 0.5 percent by weight Triton X-200 were equilibrated at 76° C. and atmospheric pressure, 13 percent of the surfactant originally present in the aqueous phase partitioned into the oil. Addition of high pressure $CO_2$ (2500 psi) caused the surfactant partitioning to increase from 13 to 40 percent. In the presence of high pressure $CO_2$, the brine concentration had to be reduced from about 120,000 to about 48,000 ppm/TDS in order to return the surfactant partitioning back to about the original level. Dissolving about 4 percent high pressure $CO_2$ in brine under these conditions, therefore, has about the same effect on Triton X-200 partitioning as increasing the salinity of the water by 72,000 ppm/TDS.

These results are graphically displayed in FIG. 4. FIG. 4 shows that the majority of the beneficial effect of lowering the salinity on surfactant partitioning occurs during the first dilution from 100 to 80 percent "D" sand water. The corresponding surfactant loss into the oil decreases from 40.3 to 16.9 percent.

It was found that removing the nonsulfonated reaction products from the Triton X-200 reduced the loss of surfactant into the reservoir oil from 40.0 to 16.7 percent in the presence of full strength synthetic reservoir water and high pressure $CO_2$. Such a "purification" can be effected by hydrolyzing any ethoxysulfate compounds present in the surfactant material and then removing nonionic compounds by ion-exchange.

The surfactant used in the present process can consist essentially of at least one water-soluble polyalkoxy sulfonate surfactant which is capable of exhibiting the specified dispersing and partitioning properties in contact with the reservoir oil or a substantially equivalent oil, but preferably has the formula

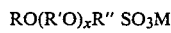

where: R is an aliphatic or aliphatic-aromatic hydrocarbon radical containing from about 6 to 25 carbon atoms connected to an oxygen atom. R' is an ethylene radical or a predominantly ethylenic mixture of ethylene and propylene radicals that are each connected between oxygen atoms, x is a number at least equalling 1; R" is a saturated aliphatic $C_2$ or $C_3$ hydrocarbon radical or—$CH_2CHOHCH_2$—radical connected between an oxygen and a sulfur atom; and M is an alkali metal or ammonium ion.

The present invention is particularly advantageous in being suited for use in reservoirs which are too hot and/or those at which the only feasibly available brine is too highly saline to be treated with other types of surfactants. However, the present invention can be used in substantially any reservoir in which the oil is capable of exhibiting the specified surfactant, $CO_2$ and brine dispersing properties with a sulfonate surfactant of the above formula.

In general, the sulfonate surfactants of the above formula which are particularly preferred for use in the present process are those which contain a total of from about 6 to 12 (preferably 8 to 9) carbon atoms in saturated or unsaturated alkyl groups attached to a phenyl group which is attached by an ether-oxygen atom to a chain of from about 2 to 6 (preferably 2 to 4) ethoxy groups which chain is terminated by an ethanesulfonate group. Numerous individual members of such compounds and procedures by which they can be manufactured are mentioned in "Surface Active Agents" by A. M. Schwartz and J. W. Perry, Vol. 1 and 2, Interscience publishers, N.Y., 1949, and U.S. Pat. Nos. 3,827,497; 3,977,471; 4,066,124; 4,018,278 and 4,088,189. One type of particularly suitable compound comprises octylphenoxypolyethoxyethane sulfonates having oil-displacing and foam-forming properties at least substantially equivalent to those of the Triton X-200 sulfonate surfactant. Another type of particularly suitable polyalkoxyalkane sulfonate surfactants are prepared by ethoxylating aliphatic alcohols which contain from about 8 to 25 carbon atoms, to form a chain of from about 2 to 45 ethoxy groups ended by a terminal ethane, propane, or hydroxy propane sulfonate group.

Applicants have found that especially suitable surfactants for use in the present process can comprise the products of a reaction process which is the same as or substantially equivalent to the following process. An alcohol of the formula:

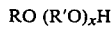

where R and R' and x are, respectively, alkyl and saturated $C_2$ hydrocarbon radicals and x is a number of from about 2 to 18, can be reacted with epichlorohydrin in the presence of stanous chloride to yield an aliphatic alkoxy glycerol chloride of the formula:

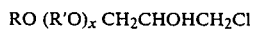

That glycerol chloride can be converted to an epoxide and then to a sulfonate by reacting it with aqueous sodium bisulfite (or first reacting it with sodium hydroxide and then reacting it with the bisulfite) to yield a sulfonate of the formula:

$$RO(R'O)_x CH_2CHOHCH_2SO_3M$$

where M is a cation as defined above. Such sulfonate surfactants where R is a $C_8$ to $C_{12}$ alkyl radical, R' is an ethylene radical and X is 3 to 18 or R is a $C_{12}$ to $C_{15}$ alkyl radical, R' is an ethylene radical and x is 7 to 25, have been prepared by the process described above.

The sodium salt of the sulfonate in which R is a $C_{12}$ to $C_{15}$ alkyl radical, R' is an ethylene radical and x is 12 (produced by the above reaction process) is exceptionally effective in the present process. It was prepared by initially reacting a polyethoxy alcohol, NEODOL® 25-12, (available from Shell Chemical Company) with epichlorohydrin. The so-prepared surfactant, which is referred to as NEGS 25-12S (for NEODOL Ethoxylate Glyceryl Sulfonate), has been found to be particularly effective at high temperatures and high brine salinity. A similar, lower molecular weight, sodium sulfonate NEGS 91-8S in which R is a $C_9$ to $C_{11}$ alkyl radical, R' is an ethylene radical and x is 8, has also been prepared. In preliminary tests the efficiency at high temperatures and high salinity of the NEGS 91-8S (although somewhat differentt in behavior) seems at least substantially equal to that of NEGS 25-12S.

The saline aqueous solution (or water or brine) which is used in the present process can be substantially any which can be flowed through the reservoir to be treated without significant change due to dilution and/or increases in salinity due to diffusion and/or ion-exchange effects within the reservoir. That brine should remain substantially unchanged in its partitioning properties with respect to the amount of surfactant which is partitioned into the oil. Such a brine is preferably the brine produced from the reservoir to be treated or produced from a nearby reservoir. When the reservoir has been waterflooded with a brine less saline than the reservoir brine, the brine used in the present process preferably has a salinity which is substantially equivalent in the effective ratio of monovalent to multivalent cations relative to the brine used in the waterflood after it reached a state of equilibrium with the rocks in the reservoir. The determinations which are made of the capability of a given polyalkoxy aliphatic surfactant material to provide the specified dispersions can be based on previously acquired information regarding the particular surfactant and/or oil but they are preferably conducted with the reservoir oil, or a substantially equivalent oil, the $CO_2$ and the water to be injected into the reservoir. Where tests or determinations are made of the partitioning properties, the determinations of dispersion-forming capability can be made before or after the testing or other evaluating of the surfactant for its partitioning properties.

The testing of the surfactant for its partitioning or solubility properties in the reservoir fluids can be conducted by a variety of known procedures (utilizing the fluids which are in, or are to be injected into, the reservoir, or substantially equivalent fluids, at the reservoir temperature and a $CO_2$-liquefying pressure). Such tests can, for example, involve partitioning measurements of the type described in connection with FIG. 4 and/or laboratory tests of sand pack or core tests of the pressure gradients and/or oil-displacement effects of flowing the combinations of the surfactant and brine through packs or cores having properties indicative of those of the reservoir to be treated.

A drive fluid used for displacing a bank or slug of fluid containing the dispersion of $CO_2$ in surfactant solution (as injected or formed within the reservoir by the injected substantially liquefied $CO_2$, brine and surfactant) through a reservoir can be substantially any drive fluid which is capable of displacing such a mixture within a reservoir formation. Particularly suitable fluids comprise aqueous liquids and/or mixtures of aqueous liquids and gas having mobilities at least substantially as low as that of said bank of fluid. Suitable fluids can comprise water, brine, carbonated water, flue gas, nitrogen, etc.

A particularly important aspect of the present invention is a capability of adjusting the pressure gradient between the injection and production locations within a reservoir by relatively simple changes in the composition variables such as the ratio of surfactant to brine, the ratio of $CO_2$ to brine and/or the sequencing of such fluids. By means of such changes, the pressure gradient can readily be adjusted to a value from about 2 to 100 times higher than that for the injection of the brine alone (where the brine salinity is substantially equal to that of the water in the swept zone of the reservoir). In general, the pressure gradient declines during an injection of $CO_2$ and increases during an injection of the surfactant in brine solution, and also increases with the concentration of the surfactant in that solution.

In general, where the $CO_2$ and the solution of surfactant in brine are not mixed prior to their entry into the reservoir the sizes of the slugs of the alternate gas and liquid components should be not more than about 40 percent of a volume sufficient to form a bank which will remain intact while being displaced from the injection to the production locations within the reservoir. As known to those skilled in the art, the volumes required for such banks are different for different reservoirs but can be estimated by known procedures with reasonable accuracy.

In injecting alternating fluids, such as $CO_2$ and aqueous brine, using slugs smaller than about 30 percent of the volume needed to maintain an intact bank, or using smaller slugs, or a pre-mixing of such fluids, at least with respect to the substantially radial flow geometry within a reservoir being flooded, tends to ensure that the injected portions of the $CO_2$ and brine are substantially homogeneously mixed as a dispersion of $CO_2$ in surfactant solution before or soon after they enter the reservoir. In a particularly preferred procedure it is advantageous to first inject a sequence of at least one each of slugs of volumes amounting to about 20-30 percent of that needed for an intact bank of, respectively, surfactant-containing brine and $CO_2$ prior to an injection of an alternating sequence of smaller slugs or a simultaneous flow of those fluids to provide the additional volume needed for an intact bank. The bank can then be displaced with a cheaper drive fluid.

In the present process the attaining of such a homogeneous mixing near the injection well is particularly advantageous. It enables the operator to select and maintain a pressure gradient to be applied in order to provide a selected rate of flow between the injection and production locations. The selection can be made, for example, by measuring the injection pressure required to maintain that rate of flow of brine or, alternatively, the rate of brine injection required to maintain a selected pressure gradient. By monitoring such quantities the operator can be alerted substantially as soon as the bank of $CO_2$ foam (or foamulsion or mixture of $CO_2$ and liquid) which provides a relatively low mobility moves into or encounters a thief zone, such as a high permeability streak through which the fluid can flow faster at the same gradient. Such an encountering of a thief zone will cause a relatively quick alteration in the pressure and/or rate required to maintain the selected flow rate or gradient. By altering the compsition of the inflowing fluid, the operator can significantly decrease the mobility of that fluid to the extent required to maintain the average flow rate or gradient at the selected value.

Triton X-200 in "D" sand water

Oil recovery experiments were conducted in Berea sandstone cores containing "D" sand water (about 12% TDS) and a residual oil saturation of a reservoir stock tank crude oil diluted with enough isooctane to provide a viscosity equaling the live crude. The cores were maintained at about 76° C. and 2,500 psi. An injection of 5.46 PV of 0.5% Triton X-200 (5.68 g surfactant) in "D" sand water was made following the brine flood. One pore volume of high pressure $CO_2$ was then injected in a continuous manner following the surfactant solution and yielded the follow results. The oil desaturation was about 17.3 percent and the brine desaturation was about 24 percent. The results were tempered by the fact that the surfactant concentration of the effluent was only 35 percent of its injected concentration after injection of the 5.46 pore volume of the surfactant solution.

Triton X-200 in diluted "D" sand water

Comparable experiments were conducted by injecting a 1 percent solution of the Triton X-200 in the "D" sand water diluted with distilled water to 50% of its full strength. After the introduction of 1 pore volume of $CO_2$ the desaturation of the oil and brine were, respectively, 15 percent and 40.2 percent. Thus, the oil recoveries were about the same. One percent Triton X-200 in 50% "D" sand water free of $CO_2$ was injected until a total of 2.26 PV (5.68 grams of surfactant) was injected, the effluent surfactant concentration reached 89 percent of its injected concentration. The total amounts of surfactant injected in the two experiments were relatively the same. However, the brine desaturation, which is a good test of mobility control-effectiveness, was substantially doubled in the second experiment (24 percent increased to 40.2 percent). A better mobility control was also indicated by the respective oil breakthroughs. In the first experiment the oil breakthrough occurred between 0.1 and 0.2 PV of $CO_2$ injected. In the second experiment it did not occur until after 0.5 PV of $CO_2$ was injected, which is a significant difference.

NEGS 25-12S in "D" Sand Water

A NEGS 25-12S surfactant (which was the result of the reaction process described above) was subjected to comparable tests in 100 percent synthetic "D" sand water using a concentration of 0.5 percent of the surfactant. The oil and brine desaturations after the introduction of 1 PV of $CO_2$ was about 16 percent and 44.5 percent respectively. When surfactant solution free of $CO_2$ was injected, the effluent concentration reached 90 percent of the initial concentration after about 2.6 PV. Thus, NEGS 25-12S in respect to adsorption on the rock formation and partitioning into the oil, while it measured 11.1% in the presence of high pressure $CO_2$ and full strength "D" sand water, performed about as well as Triton X-200 in 50 percent "D" sand water. Regarding the mobility control, as shown by the oil and brine desaturations, the NEGS 25-12S performed better in 100 percent "D" sand water than the Triton X-200 in 50 percent "D" sand water.

Foaming Tests

Applicants have discovered several simplified testing procedures that can be used for obtaining valuable information concerning whether a surfactant is apt to exhibit both a capability of (a) forming a homogeneous dispersion in which $CO_2$ and a solution of the surfactant in saline aqueous liquid are dispersed within the reservoir oil at the reservoir conditions and (b) maintaining an adequate amount of surfactant in that solution when the solution and $CO_2$ are equilibrated with the reservoir oil at reservoir conditions.

One such test (a "test tube shaking"test) uses a 30 ml volume calibrated test tube which has a tight fitting cap and is charged with a volume of liquid and oil, leaving space for agitation by shaking. The liquid comprises a mixture of an aqueous solution of the surfactant in saline aqueous liquid (using concentrations of the surfactant and the electrolyte in the solution selected for comparison or, e.g., the concentrations to be employed in treating the reservoir). The oil is the reservoir oil, or an equivalent oil (or, for a more severe test, a substantially one-to-one volume mixture of decane and toluene). It has been found that in these tests, increasing the salinity to 1.5 times that of D" sand water has about the same effect on surfactant partitioning into the oil as that caused by pressurizing the sample to 2500 psi with $CO_2$ at 76° C. The amount of salinity increase required to cause equivalent partitioning to that caused by $CO_2$ can be determined by mixing, equilibrating, separating and analyzing the fluid phases as described above.

The so-charged test tubes are brought to the appropriate reservoir temperature in a controlled temperature bath and then shaken. Foam height is measured 1, 10 and 60 minutes after shaking. A preferred procedure is to test the foaming ability of the surfactant solution without oil, and also with crude oil, decane, and the decane/toluene mixture.

Surfactants, such as those which are indicated to be attractive by the test tube shaking tests, especially if the surfactant foams in the more severe test using the decane/toluene mixture in place of decane or crude oil, can advantageously be subjected to testing in the high pressure cell with $CO_2$ and crude oil at reservoir conditions. Although the test with the decane/toluene and increased salinity is severe, it appears to closely model the effects caused by partitioning and oil spreading observed when the surfactant solution, $CO_2$ and crude oil are equilibrated at high-temperature, high-salinity reservoir conditions.

In response to the "test tube shaking" described above, using brine essentially equivalent to "D" sand water ($\sim$120,000 TDS) and then brine of about 1.5 times the salinity of "D" sand water (i.e. about 180,000 TDS) with decane and then decane/toluene, the results at 75° C. listed in Table 1 were obtained.

TABLE 1

Foam Height Ratio $\frac{\text{of Height After 10 Minutes}}{\text{of Height After 1 Minute}}$

| Surfactant | Decane | | Decane/Toluene | |
|---|---|---|---|---|
| | Synthetic "D" sand water concentration | | | |
| | 1 × | 1.5 × | 1 × | 1.5 × |
| 1. Dobanol[1] 25-1S | 0 | 0 | 0 | 0 |
| 2. Dobanol 25-3S | 0.7 | 0 | 0 | 0 |
| 3. Dobanol 25-6S | 0.8 | 0.8 | 0.2 | 0 |
| 4. Dobanol 25-12S | 0.5 | 0.4 | 0 | 0 |
| 5. Dobanol 25-16S | 0.5 | 0.4 | 0.5 | 0 |
| 6. NEGS[2] 25-3S | 0.5 | 0.4 | 0.6 | 0 |
| 7. NEGS 25-7S | 0.9 | 0.4 | 0.7 | 0 |
| 8. NEGS 25-12S | 0.9 | 0.6 | 0.7 | 0.8 |
| 9. NEGS 25-18S | 0.8 | 0.6 | 0.5 | 0 |
| 10. NEGS 91-8S | 0.9 | 0.6 | 0.2 | 0.3 |

[1]Each tested sample of Dobanol surfactant has the formula $RO(CH_2CH_2O)_xCH_2CH_2SO_3Na$ where R is a linear alkyl radical containing 12 to 15 carbon atoms and x is the number between "—" and "S" in the sample designation

[2]Each tested sample of NEGS surfactant has the formula $RO(CH_2CH_2O)_xCH_2CHOHCH_2SO_3Na$ where R is a linear alkyl radical containing 12 to 15 carbon atoms or 9 to 11 carbon atoms (91-8S) and x is the number between "—" and "S" in the sample designation.

Another foam-forming and oil-partitioning test amounts to a substantial quantification of the high pressure test procedure described with respect to FIG. 3. A high pressure test cell (preferably a windowed sight-cell) is charged with a volume of liquid and $CO_2$, leaving space for agitation by shaking or rocking the cell. The liquid comprises a mixture of an aqueous solution of the surfactant in saline aqueous liquid (using concentrations of the surfactant and the electrolyte in the solution selected for comparison or, e.g. the concentrations to be employed in treating the reservoir) and the reservoir oil, or an equivalent oil.

The liquid-containing cell is pressurized with $CO_2$ at a selected pressure and temperature (preferably the conditions to be encountered within the reservoir). Various ratios of the volumes of the surfactant solution, oil and $CO_2$ (at the selected pressure and temperature) can be used, such as a one-to-one volume ratio or an oil-volume amounting to 30% of the surfactant solution volume where the liquid and $CO_2$ volumes are about equal (for substantially matching the volume ratio commonly encountered within an oil-containing reservoir).

The charged cell is then agitated until its contents are thoroughly mixed. As soon as the fluids in the cell become substantially static, a measurement is made of the height of the foam within the cell (for example, by using a ruler along the glass of the sight cell). A second measurement of height of the foam column is made in a selected time (e.g., after 30 minutes where the reservoir oil is used, or after 10 minutes where the decane-toluene mixture is used). The ratio of the foam heights at the different times provides a good indication of the relative probable capabilities of the surfactants testing for both forming mobility-reducing dispersions and maintaining an adequate surfactant in the liquid-phase of an equilibrated mixture of surfactant solution, $CO_2$ and oil within the reservoir.

Table 2 lists the results of testing a series of samples of surfactants by the above procedure. The tests used a one-to-one volume mixture of liquid and $CO_2$ at 75° C. and 2500 psig and the liquid contained 0.5% by weight of surfactant dissolved in brine containing 120,000 ppm total dissolved salt.

TABLE 2

| Surfactant | Foam Height Ratio $\frac{\text{(Height after 30 min)}}{\text{(Height after 1 min)}}$ |
|---|---|
| 1. Dobanol[1] 25-4S | .25 |
| 2. Dobanol[1] 25-7S | .5 |
| 3. Dobanol[1] 25-9S | .5 |
| 4. Dobanol[1] 25-12S | .5 |
| 5. Dobanol[1] 25-16S | .7 |
| 6. NEGS[2] 25-3S | .5 |
| 7. NEGS[2] 25-7S | .7 |
| 8. NEGS[2] 25-12S | .8 |

[1]Each tested sample of Dobanol surfactant has the formula $RO(CH_2CH_2O)_xCH_2CH_2SO_3Na$ where R is a linear alkyl radical containing 12 to 15 carbon atoms and x is the number between "—" and "S" in the sample designation.

[2]Each tested sample of NEGS surfactant has the formula: $RO(CH_2CH_2O)_xCH_2CHOHCH_2SO_3Na$ where R is a linear alkyl radical containing 12 to 15 carbon atoms and x is the number between "—" and "S" in the sample designation.

As indicated by the results listed in Tables 1 and 2, Dobanol 25-16S, NEGS 25-7S, NEGS 25-12S and NEGS 91-8S are likely to be good surfactants for use at the tested conditions.

Applicants have also discovered that, relative to a particular reservoir oil and saline aqueous liquid solution of surfactant to be used (or encountered) at the conditions involved in a particular oil recovery operation, the above tests for characterizing foam-forming and oil-partitioning can be utilized to reduce the cost of the surfactant to be used in producing the oil. In such a utilization, at least substantially quantitative measurements are made of (a) the foam-forming and oil-partitioning characteristics of at least one polyalkoxy surfactant (such as a polyalkoxy aliphatic hydrocarbon sulfonate surfactant, or a nonionic surfactant) having a significant magnitude of such capabilities in contact with $CO_2$, the saline aqueous liquid to be used (or a substantially equivalent liquid) and the reservoir oil (or a substantially equivalent oil) at the conditions to be encountered in the reservoir and/or (b) an aliphatic/aromatic (in place of the reservoir oil). Then, comparable measurements are made of at least one other surfactant which is a member of the same chemical class but contains both fewer carbon atoms and fewer alkoxy groups. Unobviously, it appears that reducing both the number of carbon atoms and alkoxy groups in a polyalkoxy surfactant while maintaining a substantially constant HLB for the surfactant may provide relatively little, if any, change in the foam-forming and oil-partitioning characteristics (i.e., the primary characteristics needed for efficient oil recovery). However, a reduction in the number of alkoxy groups may make a significant difference in the amount of catalyst needed, and thus the cost involved in manufacturing the surfactant. For example, a reduction of from 12 to 7 ethylene oxide groups was found to reduce the amount of catalyst required by about one-half. Thus, the utilizing of such a testing procedure may substantially minimize the cost of the surfactant. The testing may provide a means for determining how the surfactant to be used can be most economically manufactured without diminishing the amount of oil to be recovered.

Where such tests are conducted with aliphatic/aromatic hydrocarbon solvents other than a decane/toluene mixture, the mixture can contain substantially any liquid hydrocarbons that form a mixture having solvent properties at least substantially equalling those of the decane/toluene mixture.

The determining (and thus the maintaining) of the HLB (Hydrophile-Lipophile Balance) of a surfactant is a known procedure. That balance is an expression of the relative simultaneous attraction of an emulsifier for water and oil. For nonionic surfactants it can be readily calculated and for anionic surfactants it can be determined by blending a surfactant being tested, in varying ratios, with an emulsifier of known HLB and using the blend to emulsify an oil having a known HLB requirement for emulsion (see Kirk-Othmer Encyclopedia of Chemical Technology, Interscience Publishers 1963, Volume 8, pages 131 and 132).

What is claimed is:

1. In a process in which substantially liquefied $CO_2$, surfactant, and aqueous liquid are injected into a subterranean oil and water-containing reservoir for displacing oil within the reservoir, the improvement comprising:

selecting a surfactant consisting essentially of at least one water-soluble polyalkoxy sulfonate surfactant which is capable of dissolving in an aqueous liquid that is suitable for being injected into the reservoir, to form an aqueous surfactant solution capable of forming relatively stable dispersions with substantially liquefied $CO_2$ and the reservoir oil or a substantially equivalent oil at the reservoir temperature, which dispersions consist of, respectively, $CO_2$ dispersed in the solution, $CO_2$ and the oil dispersed in the solution, and $CO_2$ and the solution dispersed in the oil;

adjusting the composition of the surfactant and/or the aqueous liquid to the extent required so that, when a solution of the surfactant in the liquid contains enough surfactant for significantly reducing the mobility of a mixture of the solution and substantially liquefied $CO_2$ at the reservoir temperature, a proportion effective for maintaining such a mobility reduction remains within the aqueous solution when the mixture is equilibrated with the reservoir oil at the same conditions; and injecting substantially liquid $CO_2$ and the so-selected and adjusted surfactant and aqueous liquid into the reservoir in a manner such that a dispersion of the $CO_2$ in a solution of the surfactant in the aqueous liquid is formed before or soon after those materials enter the reservoir and the initially formed dispersion is capable of preferentially displacing water within the reservoir while flowing around droplets of the reservoir oil, subsequently dispersing at least some reservoir oil along with the $CO_2$ within the surfactant solution, and subsequently dispersing $CO_2$ and surfactant solution with the reservoir oil.

2. The process of claim 1 in which the injected aqueous liquid is water recovered from the reservoir.

3. The process of claim 1 in which the injected aqueous liquid is water equivalent to water recovered from the reservoir diluted with a less saline water containing a substantially equivalent ratio of monovalent cations to multivalent cations.

4. The process of claim 3 in which the selected water-soluble polyalkoxy sulfonate surfactant is purified by removing incompletely reacted products and/or reaction byproducts from the sulfonate surfactant component.

5. The process of claim 1 in which the selected water-soluble polyalkoxy sulfonate surfactant is purified by removing incompletely sulfonated materials and/or sulfonation reaction byproducts from the sulfonate surfactant component.

6. The process of claim 1 in which a slug of the injected substantially liquefied $CO_2$ and surfactant and water is followed by a drive fluid.

7. The process of claim 1 in which the selected surfactant has the formula:

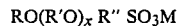

$$RO(R'O)_x R'' SO_3M$$

where: R is an aliphatic or aliphatic/aromatic hydrocarbon radical that contains from about 6 to 25 carbon atoms and is connected to an oxygen atoms; R' is an ethylene radical or a predominantly ethylene mixture of ethylene and propylene radicals that are each connected between oxygen atoms, x is a number at least equalling 1; R'' is a saturated aliphatic $C_2$ or $C_3$ hydrocarbon radical or a $CH_2CHOHCH_2$ radical connected between an oxygen and a sulfur atom; and M is an alkali metal or ammonium ion.

8. The process of claim 7 in which R'' is a —$CH_2$CHOHCH$_2$— radical.

9. The process of claim 8 in which R is an 8 to 15 carbon atom alkyl radical, R' is an ethylene radical and x varies from about 3 to 9 when R equals 8 to 11, and x varies from about 6 to 18 when R equals 12 to 18.

10. The process of claim 9 in which the injected water is water recovered from the reservoir.

11. The process of claim 8 in which R is a 9 to 11 carbon atom alkyl radical, R' is an ethylene radical and x is about 4.

12. The process of claim 8 in which R is a 12 to 15 carbon atom radical, R' is an ethylene radical and x is about 12.

13. The process of claim 1 in which the dispersion forming capability of said selected surfactant is tested by mixing and observing the materials to be injected in a high pressure sight-cell.

14. The process of claim 13 in which the partitioning affect of $CO_2$ and the reservoir oil on said so-selected and adjusted surfactant and aqueous liquid are tested by substantially equilibrating them at reservoir conditions and measuring the proportion of the surfactant that is partitioned into the oil.

15. The process of claim 1 in which the amount of the $CO_2$, surfactant and aqueous liquid which is injected is substantially sufficient to form a bank of $CO_2$ dispersed in surfactant solution having a volume sufficient to remain intact while being displaced through the reservoir substantially from the injection to the production location.

16. The process of claim 15 in which the flow rate or pressure gradient within the reservoir is monitored during said bank formation and the proportion of $CO_2$ and surfactant are adjusted to the extent necessary to attain and maintain a selected average flow rate or pressure gradient.

17. A process for selecting a water-soluble polyalkoxy surfactant of substantially minimum cost to manufacture for use in a process for recovering oil from an oil and water-containing subterranean reservoir by injecting substantially liquefied $CO_2$, surfactant, and aqueous liquid into the reservoir, comprising:

mixing a water-soluble polyalkoxy surfactant with an aqueous liquid suitable for being injected into the reservoir, using proportions at least substantially suitable for use in the oil recovery operation, and mixing the resultant solution with significant proportions of each of $CO_2$ and the reservoir oil or a substantially equivalent oil;

pressurizing and heating the resultant mixture within a vertically elongated chamber so that the $CO_2$ is substantially liquefied at the temperature of the reservoir;

agitating the pressurized and heated mixture so that its components are throughly mixed;

measuring the heights of the resultant foam column within the chamber both substantially as soon as the fluids become substantially static and after a selected delay time;

repeating the above steps with at least one other surfactant of the same chemical class in which the numbers of carbon atoms and alkoxy groups are both reduced in a manner which maintains a substantially equal hydrophile-lipophile balance; and identifying as said surfactant for use in the reservoir at least one surfactant in which the numbers of alkoxy groups and carbon atoms are substantially as small as possible without significantly reducing the ratio of said measured heights of foam columns.

18. The process of claim 17 in which the surfactant being tested is a polyalkoxy aliphatic sulfonate.

19. The process of claim 17 in which the surfactant solution being tested is mixed with said oil solvent mixture of aliphatic and aromatic hydrocarbons.

20. The process of claim 19 in which the surfactant being tested is a polyalkoxy aliphatic sulfonate.

21. A process for selecting a water-soluble polyalkoxy surfactant for use in a reservoir comprising:

measuring foam-forming and oil-partitioning properties of a polyalkoxy surfactant which exhibits significant foam-forming and partitioning-resistance in contact with $CO_2$ and the reservoir oil at the reservoir temperature and the pressure to be encountered within the reservoir;

measuring those properties of at least one other surfactant which is a member of the same chemical class, and has substantially the same hydrophile-lipophile balance but contains fewer carbon atoms and fewer alkoxy groups; and selecting for use in the reservoir at least one of said surfactants which contain relatively few carbon atoms and alkoxy groups but are substantially as effective as those of said surfactants which contain more of those groups.

* * * * *